United States Patent
Bretherick

[11] 3,911,092
[45] Oct. 7, 1975

[54] METHOD FOR CONVERTING AMMONIUM SULFATE TO AMMONIUM BISULFATE

[75] Inventor: Ormond Bretherick, Burlingame, Calif.

[73] Assignee: Bohna Engineering & Research Inc., San Francisco, Calif.

[22] Filed: June 10, 1974

[21] Appl. No.: 477,779

Related U.S. Application Data

[63] Continuation-in-part of Ser. No. 125,079, March 17, 1971, abandoned.

[52] U.S. Cl. .............. 423/520; 423/356; 423/545; 23/262
[51] Int. Cl.² ...................... C01C 1/24; C01C 1/02
[58] Field of Search ............ 423/545, 520, 512, 356

[56] References Cited
UNITED STATES PATENTS

| | | | |
|---|---|---|---|
| 393,258 | 7/1943 | Beck et al. | 423/659 |
| 2,700,004 | 1/1955 | Miller | 423/143 X |
| 2,899,277 | 8/1959 | Holowaty | 423/359 |
| 3,047,369 | 7/1962 | Montgomery | 23/285 X |
| 3,243,261 | 3/1966 | Deiters | 423/512 X |
| 3,321,275 | 5/1967 | Furkert et al. | 423/356 |
| 3,383,170 | 5/1968 | Furkert et al. | 423/356 |
| 3,674,427 | 7/1972 | Welty, Jr. | 423/545 X |

*Primary Examiner*—Edward Stern
*Attorney, Agent, or Firm*—Phillips, Moore, Weissenberger, Lempio & Strabala

[57] ABSTRACT

A method and apparatus illustrated by two embodiments, for efficiently converting ammonium sulfate to ammonium bisulfate. In both embodiments, a second stage receives ammonium sulfate dissolved in ammonium bisulfate with conversion of the ammonium sulfate being effected by direct heat transfer, preferably in a venturi nozzle where a hot gas stream is intermixed with a solution of ammonium sulfate dissolved in ammonium bisulfate. In one embodiment, a first stage includes a mixer which is also preferably a venturi nozzle for mixing an aqueous solution of ammonium sulfate with recycled ammonium bisulfate and an evaporator which employs direct heat exchange for removing water from the solution. In the first stage of the other embodiment, solid ammonium sulfate is dissolved in the recycled ammonium bisulfate.

11 Claims, 2 Drawing Figures

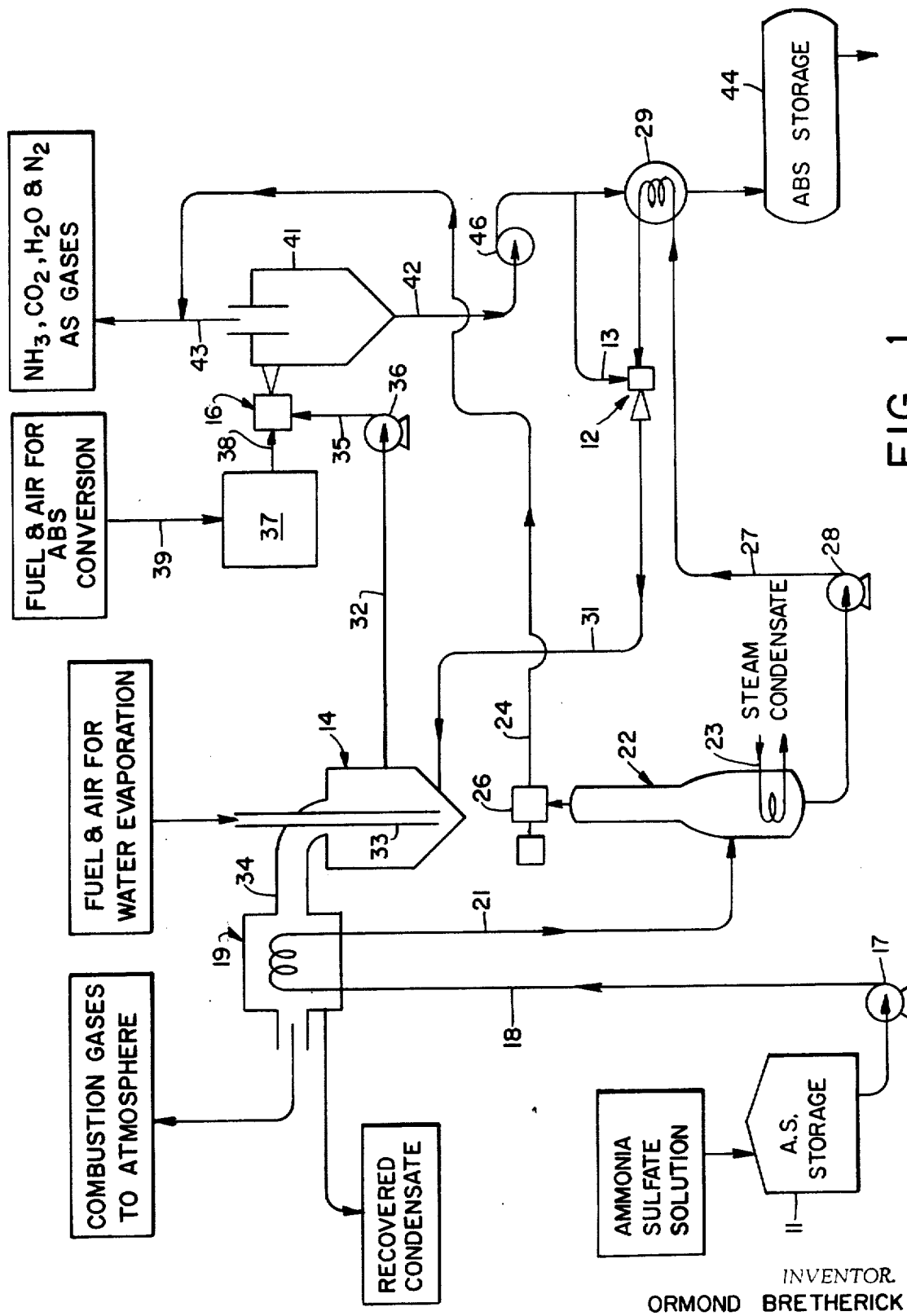
FIG_1

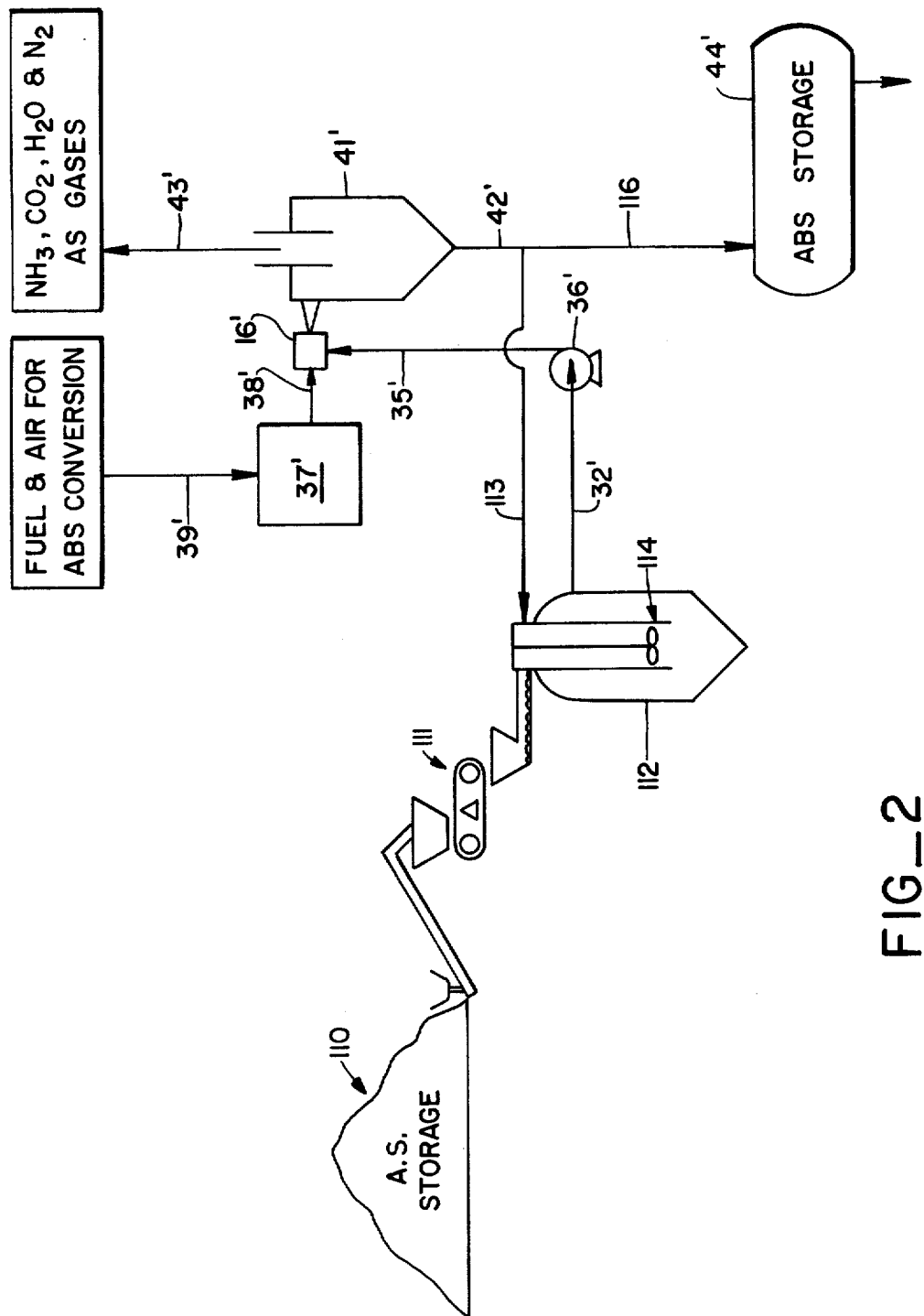
FIG_2

METHOD FOR CONVERTING AMMONIUM SULFATE TO AMMONIUM BISULFATE

BACKGROUND OF THE DISCLOSURE

This is a Continuation-In-part of application Ser. No. 125,079, filed Mar. 17, 1971 and abandoned in favor hereof.

The present invention relates to a method and apparatus for producing ammonium bisulfate by thermal decomposition of ammonium sulfate. This endothemic reaction, which takes place above approximately 450° F., substantially in the range of 450° – 650°F., also yields recoverable free ammonia and may be set forth as:

$$(NH_4)_2 SO_4 \rightleftarrows NH_4HSO_4 + NH_3$$

According to the present invention, the ammonium sulfate is dissolved in recycled molten ammonium bisulfate to form an anhydrous solution of ammonium sulfate and ammonium bisulfate. In the second stage, the dissolved ammonium sulfate is decomposed to form ammonium bisulfate and ammonia which may be separately recovered, a portion of the ammonium bisulfate being recycled as noted above.

Ammonium bisulfate has been found to be useful, for example as an acidulating agent. In particular, it has proven to be a satisfactory replacement for sulfuric acid in many chemical reactions. Typical applications in which ammonium bisulfate may be employed include the digestion of mineral ores, pickling of steel and production of phosphoric acid from phosphatic materials.

However, for ammonium bisulfate to be competitive with large volume chemicals, such as sulfuric acid, it is necessary to provide a method and apparatus for producing the bisulfate wherein capital expenditures may be minimized and high efficiency, particularly thermal efficiency may be achieved.

The highly corrosive nature of pure molten ammonium bisulfate creates a particular problem which must be overcome to minimize capital costs, both for initial installation and replacement of equipment.

Prior art systems for producing ammonium bisulfate have tended to surffer on a competitive basis from deficiencies in either or both the areas of operating efficiency or corrosion effects.

Possibly the most common prior method of producing ammonium bisulfate involved the decomposition of solid ammonium sulfate under a vacuum or through the use of stripping-gas by indirect heat transfer through the walls of various heat transfer vessels. In such a method, indirect heat transfer provides very poor thermal efficiency. Further, the highly corrosive nature of ammonium bisulfate makes it particularly difficult to handle in such systems. To date, Tantalum metal, silica or ceramic refractory materials and possibly graphite are probably the only known materials which will withstand attack by ammonium bisulfate, particularly in a substantially pure, molten state at elevated temperatures. Of these materials, tantalum metal is inherently very expensive. Further the fabrication of relatively complex process equipment such as pumps and thin-walled heat exchangers from such materials is difficult and expensive.

Another approach has been the decomposition of solid ammonium sulfate in direct gas-fired rotary kilns. Here again, thermal efficiency is poor because of the relatively small interfacial surface area between the ammonium sulfate and the hot gases. Also, the same corrosion problems tend to arise because of the large region of production for ammonium bisulfate.

Still another prior art method is illustrated for example by U.S. Pat. No. 3,243,261 issued Mar. 29, 1966 to W. Deiters which is primarily concerned with a process for obtaining ammonia and sulfur oxides from ammonia sulfate. However, the process described in that patent initially converts ammonium sulfate to ammonium bisulfate and, as in the present invention, a portion of the ammonium bisulfate is recycled to act as a carrier for ammonium sulfate which is introduced into the process. However, the process of that patent is not directed toward maximizing thermal efficiency and minimizing harmful effects of corrosion, either or both of which are important features of the present invention.

Accordingly, it is a particular object of the present invention to provide a method and apparatus for efficiently converting ammonium sulfate to ammonium bisulfate.

In one embodiment of the present invention, thermal efficiency is initially maximized by employing direct heat transfer in a first stage where substantially all water is removed from a solution of ammonium sulfate and ammonium bisulfate and a second stage where the dissolved ammonium sulfate is converted to ammonium bisulfate and ammonium at elevated temperatures.

Preferably, submerged combustion means are employed in the first stage to directly communicate hot combustion gases into the ammonium sulfate-bisulfate solution to most efficiently drive off water from the solution.

In either described embodiment of the invention, a substantially anhydrous solution of ammonium sulfate and ammonium bisulfate is delivered to a second stage wherein the dissolved ammonium sulfate is decomposed at elevated temperatures into ammonium bisulfate and ammonia. Hot combustion gases under pressure are intermingled with the solution and raise its temperature to a suitable level for converting the dissolved ammonium sulfate to ammonium bisulfate. This feature of the invention provides several advantages. Initially, the direct heat exchange between the gases and the solution maintains the desired high thermal efficiency for the system.

Further, pressurization of the combustion gases may be utilized to effect intermingling between the gases and the solution for effective heat exchange and to assist in transferring ammonium bisulfate and ammonium gas out of the second stage. Thus, a further object of the invention is realized in that the second stage reaction takes place in a relatively simple vessel or chamber which may be readily construced from a corrosion resistant material such as silica.

Preferably, the second stage reaction occurs within a venturi nozzle where pressure of the combustion gases may be employed to accomplish intimate mingling between the gases and the solution.

It is a further object of the present invention to achieve the second stage conversion of ammonium sulfate to ammonium bisulfate in a very short time in order to realize particular advantages of the invention. The contemplated apparatus and method of the invention, as set forth below inherently provides substantially instantaneous conversion to ammonium bisulfate through the intimate and direct intermingling of the ammonium sulfate containing solution with the hot gases. In particular, the substantially instantaneous nature of the second stage conversion permits minimization of the size of the reaction chamber which may also be of simplified construction because of the use of nozzle means for intimately dispersing and intermingling the solution of ammonium sulfate within the hot gas stream. The substantially instantaneous nature of the second stage reaction is also made possible because of the substantially anhydrous form of the ammonium sulfate solution. Thus, the second stage reaction does not require either the time or energy otherwise necessary for vaporizing water in the solution.

The method and apparatus for accomplishing the second stage reaction permits further control over thermal efficiency. Trace quantities of water or water vapor can be introduced with the combustion gases to inhibit or prevent the formation of pyrosulfates during the second stage reaction. Pyrosulfate formation is undesirable since it increases thermal consumption and impairs efficiency of the present system.

On the other hand, any water vapor present during the second stage reaction escapes as a gas along with the free ammonium and must be removed to produce substantially anhydrous ammonia. Within the system of the present invention, a substantially anhydrous solution of ammonium sulfate and ammonium bisulfate is delivered to the second stage. Controlled quantities of water, for example, 3-5 percent by weight of the ammonium sulfate to be converted, may then be introduced along with the combustion gases employed in the second stage reaction. Thus, the amount of water present during the second stage reaction may be optimized to prevent pyrosulfate production while requiring only minimum energy for its removal from the free ammonia.

It is still another object of the invention to minimize corrosion effects downstream of the second stage reaction.

Particularly in the one embodiment of the invention where an aqueous feedstream of ammonium sulfate is introduced into the system, it is further contemplated to employ another venturi nozzle for intermixing the aqueous solution of ammonium sulfate and the ammonium bisulfate. Since the aqueous ammonium sulfate is relatively non-corrosive, it may be readily driven under pressure through the venturi nozzle, for example by a pump. With the ammonium bisulfate being introduced through a sidearm of the venturi, a vacuum is created which assists in transferring the recycled ammonium bisulfate. This feature of the invention also reduces or obviates the need for a corrosion-resistant pump in contact with the pure, molten ammonium bisulfate.

Additional objects and advantages of the present invention are made apparent in the following system having reference to the accompanying drawings.

In the drawings:

FIG. 1 is a generally schematic representation of a two-stage system according to the present invention for receiving an aqueous solution of ammonium sulfate with the ammonium sulfate being decomposed to substantially anhydrous ammonium bisulfate and ammonia; and FIG. 2 is a generally schematic representation of a similar system wherein the ammonium sulfate is introduced as a substantially anhydrous solid.

One embodiment of a method and apparatus for converting ammonium sulfate to ammonium bisulfate according to the present invention is illustrated in FIG. 1. To summarize the most important features of the system illustrated in FIG. 1, an aqueous solution of ammonium sulfate, for example 40 percent by weight, is delivered from storage 11 to a first stage operation including mixing means such as the venturi nozzle 12. The aqueous ammonium sulfate solution is intimately mixed with a recycle stream of ammonium bisulfate which is delivered to the sidearm 13 of the nozzle 12 in a manner discussed in greater detail below. The aqueous solution of ammonium sulfate and ammonium bisulfate then passes to an evaporator or concentrator 14 wherein direct heat exchange is employed to remove substantially all water from the aqueous solution leaving a substantially anhydrous solution of ammonium sulfate in ammonium bisulfate. The temperature of the solution in the evaporator is raised to approximately 400°F., the particular temperature depending on the specific composition of the solution, so that substantially all water is driven off while none of the sulfate is decomposed.

The resulting anhydrous solution is then directed to the second stage, represented by the venturi nozzle 16 where the dissolved ammonium sulfate is decomposed to ammonium bisulfate again by direct heat exchange with hot combustion gases. The ammonium bisulfate produced by the decomposition process is then separated from the other decomposition products and recovered for example in a manner set forth below. A portion of the ammonium bisulfate is recycled to the mixing venturi nozzle 12 and the remainder is delivered to storage or to another process for employing the ammonium bisulfate.

To set forth the apparatus and method as illustrated in FIG. 1 in greater detail, an aqueous solution of ammonium sulfate is drawn from the storage tank 11 by a pump 17. In order to optimize thermal efficiency of the system, the aqueous solution is first delivered by a line 18 to a heat exchanger 19 through which exhaust gases from the evaporator 14 are directed to initially heat the aqueous solution.

In those operations where the aqueous solution contains a substantial amount of free ammonia gas, for example where the aqueous ammonium sulfate is obtained from the conversion of gypsum, the initially heated solution is then passed by a line 21 to a de-ammoniator column or still 22. The solution is further heated in the still, for example by steam in a coil 23, to drive off free ammonia which is driven through a line 24 by a blower 26 for recovery as described in greater detail below. Even in applications where it is not necessary to remove ammonia at this point, the still 22 may also be optionally used to preheat the aqueous solution of ammonium sulfate.

The aqueous solution from the still is then passed through a line 27 by a pump 28 to another heat exchanger 29 where the aqueous solution is further heated by the recycled ammonium bisulfate. It is believed apparent that the heat exchangers 19 and 29 and the still 22 are not critical to the present invention but may be of importance in providing optimum efficiency. For example, the heat exchangers may substantially reduce the required thermal input for the evaporator 14. Also, in certain applications, the still 22 may increase the amount of ammonia recovery which additionally affects operating efficiency of the system.

The aqueous solution of ammonium sulfate and ammonium bisulfate from the venturi nozzle 12 is directed to the evaporator 14 through a line 31. In the evaporator 14, the aqueous solution is heated, depending on it concentration, to a minimum temperature of approximately 400°F. for example, so that substantially all water is removed, leaving a solution of ammonium sulfate and ammonium bisulfate which is carried away by a line 32.

The evaporator 14 preferably includes a submerged combustion chamber 33 in direct communication with the aqueous solution delivered by the line 31. Maximum thermal efficiency is thus achieved in this stage of the system. Combustion gases from the chamber 33 bubble upwardly through the aqueous solution with the combustion products and water vapor preferably being communicated by a vent 34 to the heat exchanger 19 for preheating of the aqueous ammonium sulfate solution as described above.

The preferred configuration of the evaporator 14 further reduces capital requirements for the system and thus contributes to operating efficiency. For example, the preferred evaporator may be of relatively conventional design, including a tank with acid brick lining while the burner or combustion chamber 33 may be readily constructed from conventional materials such as graphite.

The anhydrous solution of ammonium sulfate and ammonium bisulfate in line 32 is delivered to the sidearm 35 of the second stage venturi nozzle 16 by a pump 36. Combustion gases under pressure from a furnace 37 are also directed into the venturi nozzle 16 through a line 38. The combustion gases and anhydrous solution are intimately mixed in the nozzle 16 to permit direct heat exchange therein. The temperature of the anhydrous solution must be raised to at least approximately 600°F. in order to completely decompose ammonium sulfate in the anhydrous solution to ammonium bisulfate.

The use of combustion gases for direct heat exchange in the nozzle 16 also provides an additional means of optimizing operating efficiency for the present system. During the thermal decomposition of ammonium sulfate in the second stage, a portion of the ammonium bisulfate carrier may also be decomposed to form ammonium pyrosulfate and water. This secondary reaction reduces the amount of ammonium bisulfate recovery and additionally increases the thermal requirement for the second stage, both of which effects decrease the operating efficiency of the system.

The presence of a small amount of water or water vapor tends to inhibit or prevent this secondary reaction while not substantially affecting the decomposition of ammonium sulfate. It is further desirable to limit the amount of water vapor present at this stage since it is later vented off together with free ammonia and must usually be removed to provide a usable grade of ammonia.

Within the system of the present invention, closely controlled amounts of water vapor may be introduced together with the combustion gases from the furnace 37 to accomplish this purpose. Since fuel and air are introduced into the furnace 37 to support combustion through line 39, sufficient water vapor may be present in the air. However, the amount of water vapor present in the air may readily be regulated if necessary to provide for the optimum water vapor content during the ammonium sulfate decomposition. The anhydrous nature of the solution delivered to the nozzle sidearm 35 further contributes to close control over the amount of water vapor present during the decomposition of ammonium sulfate.

Following substantially complete decomposition of ammonium sulfate to ammonium bisulfate, the stream exiting the nozzle 16 contains ammonium bisulfate as a molten liquid intermingled with a gaseous phase including free ammonia resulting from the decomposition reaction and combustion gases from the furnace 37, principally carbon dioxide, water vapor and nitrogen.

A cyclone separator 41 is preferably employed to remove the above gases and provide substantially pure ammonium bisulfate which exits the separator as a molten liquid through the line 42. The gases are vented off at 43 with the ammonia being readily recoverable by conventional techniques. In those applications where the still 22 is employed, additional ammonia from the line 24 may be combined with ammonia recovered from the separator 41.

The molten ammonium bisulfate in the line 42 is delivered to storage at 44 with a portion being recycled to the mixing nozzle 12 through the sidearm 13 as discussed above.

A pump 46 may be employed if necessary for transferring the molten bisulfate. As noted above, the heat exchanger 29 is not a critical element of the system but may contribute importantly to thermal efficiency.

Additional features of the present system should be particularly noted as contributing to maximum efficiency and minimum costs for the system. The recovered molten ammonium bisulfate is very corrosive, particularly at high temperatures, for example 600°F., such as in the second stage nozzle 16, the separator 41 and the line 42. The corrosive nature of the ammonium bisulfate and ammonium sulfate solution, either hydrous or anhydrous, is much less severe and can therefore be more readily controlled.

Through the use of direct heat exchange in the second stage, the mixing and reaction vessel embodied as the venturi nozzle 16 in FIG. 1 may be of a configuration facilitating construction from materials such as preferably silica ceramics or possibly graphite. The separator 41 and lines 42 and 13 may also be readily fabricated from such materials.

The corrosive nature of the molten bisulfate is a particularly severe problem when it is in contact with moving parts such as in the pump 46. Such parts are also difficult to fabricate from corrosion resistant materials any may tend to have a very short operating life. With the present system, the need for a pump in the line 42 may be at least partially avoided by use of the first venturi nozzle 12. By the inherent nature of the nozzle, a vacuum condition is created in the sidearm 13 duuring operation. Thus, recycled ammonium bisulfate tends to be drawn toward the mixing nozzle 12 and the sidearm 13 may be sized to provide the desired recycle flow rate. The storage tank 44 may also be located below the separator to permit gravity flow of the recovered ammonium bisulfate.

Thus, the embodiment of the present invention as described above with reference to FIG. 1 is believed to provide a particularly efficient and relatively inexpensive system for converting ammonium sulfate to ammonium bisulfate.

Another embodiment of the invention, similar to that described above in certain respects, is particularly adapted for use where ammonium sulfate is available as a substantially anhydrous solid. Having reference to both figures, the second stage portions of the two systems for decomposing ammonium sulfate to ammonium bisulfate are substantially similar as are the portions for recovering the ammonium bisulfate. The two systems are also similar in that molten ammonium bisulfate is employed as a carrier for the ammonium sulfate prior to its decomposition. Accordingly, similar primed numerals are employed to indicate components of the system as illustrated in FIG. 2 which substantially correspond with components of the system illustrated in FIG. 1.

Referring now to FIG. 2, solid ammonium sulfate from a stockpile indicated at 110 is transferred by a conveyor arrangement 111 to a mixing tank 112. Recycled ammonium bisulfate is also delivered to the mixer 112 through a line 113. The mixer 112 has means such as the agitator indicated at 114 for intimately mixing and dissolving the solid sulfate into the molten bisulfate. An anhydrous solution of ammonium sulfate and ammonium bisulfate is drawn from the mixer 112 through a line 32' by a pump 36' and delivered through another line 35' to a second stage including a venturi nozzle 16'.

The second stage of the system illustrated in FIG. 2 is similar to that described above with reference to FIG. 1. Dissolved ammonium sulfate is similarly converted to bisulfate which is recovered by a similar separator 42'. Molten ammonium bisulfate from the separator 41' is divided in the line 42' with a portion being recycled through the line 113 and the remainder passing to storage at 44' through a line 116. In this embodiment, it is particularly contemplated that hot, molten ammonium bisulfate flows through the lines 42', 113 and 116 under the influence of gravity in order to avoid the problems of corrosion discussed above.

A heat exchanger similar to that indicated in FIG. 1 at 29 may also be used in the line 116 to cool the molten bisulfate before it passes to storage if necessary or desired.

Thus, two embodiments of a novel process or system for converting ammonium sulfate to ammonium bisulfate are disclosed. A particularly advantageous feature of each system is the maximum operating efficiency made possible while minimizing initial and replacement costs for component parts used in the system. As suggested above, numerous changes or modifications are possible for each of the described embodiments within the scope of the present invention.

EXAMPLE

An example of the present invention is set forth below having particular reference to a system of the type illustrated in FIG. 1. It will be apparent that those portions of the example relating to the actual production and recovery of ammonium bisulfate may also be applicable to a system of the type illustrated in FIG. 2.

An aqueous solution of approximately 40 percent by weight ammonium sulfate is drawn from storage 11 by a pump 17. The aqueous solution for purposes of this example is assumed to have not free ammonia which could otherwise be removed in the still 22.

For optimum efficiency of the system, the aqueous solution is preferably delivered to the first mixing venturi at a temperature of approximately 215°F. To achieve that temperature, heat exchangers such as those indicated at 19 or 29 may be employed or the still 22 could be employed merely as a heat exchanger, operating with either direct or indirect heat exchange.

Characteristics of the nozzle 12 are selected to provide a thoroughly blended aqueous solution with approximately a 3:1 ratio of ammonium bisulfate and ammonium sulfate. With the bisulfate entering the nozzle 12 at a temperature of approximately 600°F., the resulting temperature of the aqueous solution of ammonium sulfate and ammonium bisulfate which is delivered to the evaporator 14 is approximately 390°F. Assuming a flow rate of approximately 1,375 pounds per hour of the aqueous solution of ammonium sulfate and ammonium bisulfate into the evaporator 14, the combustion chamber 33 is operated to transfer approximately 450,000 BTU's per hour to the solution. The temperature of the solution is thus raised to approximately 400°F. so that substantially all water is driven off with substantially no decomposition of the ammonium sulfate or ammonium bisulfate.

An anhydrous solution of ammonium sulfate and ammonium bisulfate, at approximately 400°F., is then delivered by the pump 36 to the nozzle 16 at a rate of approximately 1,000 pounds per hour. The furnace 37 is operated at a suitable rate so that combustion gases entering the nozzle 16 transfer approximately 140,000 BTU's per hour to the anhydrous solution in order to raise its temperature to approximately 650°F. The furnace is further regulated so that water vapor enters the nozzle 16 at a rate of approximately 7 – 12 pounds per hour.

After substantially all gases and water vapor are removed in the separator 41, molten ammonium bisulfate at approximately 600°F. passes from the separator at approximately 968 pounds per hour. Approximately 32 pounds per hour of gaseous ammonia may be recovered from the gases leaving the separator. A portion of the ammonium bisulfate is recycled to the first venturi nozzle 12 as noted above and the remainder is delivered to storage.

It is believed obvious that the apparatus and method of the present invention will achieve substantially instantaneous conversion of ammonium sulfate to ammonium bisulfate in its second stage. This is confirmed by tests of the type disclosed in the above example, which tests indicated that a substantial portion of the second stage, approximately 95 percent for example, may be completed in a fraction of one second with the remainder of the reaction being completed, for example, within a few seconds at most. These times are not intended to limit the invention but only to indicate the substantially instantaneous nature of the second stage reaction.

What is claimed is:

1. A process for converting ammonium sulfate to ammonium bisulfate comprising the steps of:

forming a substantially anhydrous molten solution of ammonium sulfate and recycled ammonium bisulfate, intimately dispersing and entraining the anhydrous solution within a hot gas stream in order to substantially instantaneously heat the solution to a temperature of at least approximately 600°F and convert substantially all of the ammonium sulfate to ammonium bisulfate, separating the resulting molten ammonium bisulfate from gaseous products including the hot gases and ammonia resulting from the conversion of ammonium sulfate to ammonium bisulfate, and recycling a portion of the molten ammonium bisulfate for forming said anhydrous solution.

2. The process of claim 1 wherein said anhydrous solution of ammonium sulfate and ammonium bisulfate is formed by mixing an aqueous solution of ammonium sulfate with recycled ammonium bisulfate and directly communicating the resulting aqueous solution with combustion gases to remove substantially all water therefrom.

3. The process of claim 2 wherein the combustion gases are produced by submerged combustion of fuel within a tank for receiving the aqueous solution of ammonium sulfate and ammonium bisulfate.

4. The process of claim 1 wherein said anhydrous solution is formed by mixing substantially anhydrous ammonium sulfate with the recycled ammonium bisulfate which is maintained in a molten condition.

5. The process of claim 1 wherein about 3–5 percent by weight of water is also intimately mixed with the anhydrous solution of ammonium sulfate and ammonium bisulfate to inhibit the conversion of ammonium bisulfate to ammonium pyrosulfate while the ammonium sulfate is being converted to ammonium bisulfate.

6. The process of claim 1 wherein the step of intimately dispersing and entraining the anhydrous molten solution within the hot gas stream is accomplished by nozzle means effective to divide the anhydrous molten solution into small droplets subsequently entrained within the hot gas stream.

7. A process for converting ammonium sulfate to ammonium bisulfate comprising the steps of:

forming a substantially anhydrous molten solution of ammonium sulfate and recycled ammonium bisulfate, employing nozzle means to intimately mix and intermingle the anhydrous solution with a hot gas stream to thereby heat the solution to a temperature of at least approximately 600°F and convert substantially all of the ammonium sulfate to ammonium bisulfate, separating the resulting molten ammonium bisulfate from gaseous products including the hot gases and ammonia resulting from the conversion of ammonium sulfate to ammonium bisulfate, and recycling a portion of the molten ammonium bisulfate for forming said anhydrous solution.

8. The process of claim 7 wherein said anhydrous solution of ammonium sulfate and ammonium bisulfate is formed by mixing an aqueous solution of ammonium sulfate with recycled ammonium bisulfate and directly communicating the resulting aqueous solution with combustion gases to remove substantially all water therefrom.

9. The process of claim 8 wherein the combustion gases are produced by submerged combustion of fuel within a tank for receiving the aqueous solution of ammonium sulfate and ammonium bisulfate.

10. The process of claim 7 wherein said anhydrous solution is formed by mixing substantially anhydrous ammonium sulfate with the recycled ammonium bisulfate which is maintained in a molten condition.

11. The process of claim 7 wherein about 3–5 percent by weight of water is also intimately mixed with the anhydrous solution of ammonium sulfate and ammonium bisulfate to inhibit the conversion of ammonium bisulfate to ammonium pyrosulfate while the ammonium sulfate is being converted to ammonium bisulfate.

* * * * *